United States Patent
Kramer, Jr. et al.

[11] Patent Number: 5,816,614
[45] Date of Patent: Oct. 6, 1998

[54] TILLER ASSEMBLY FOR PERSONAL MOBILITY VEHICLES

[75] Inventors: DuWayne E. Kramer, Jr., Lake Quivira; James Ernst, Kansas City; Jerry L. Traylor, Olathe, all of Kans.; James C. Hile, Grandview, Mo.

[73] Assignee: Burke, Inc., Kansas City, Kans.

[21] Appl. No.: 822,102

[22] Filed: Mar. 21, 1997

[51] Int. Cl.[6] ............................................. B62D 1/18
[52] U.S. Cl. ........................ 280/775; 180/208; 74/493; 74/538; 403/93; 403/117
[58] Field of Search ..................... 280/775; 180/208, 180/332, 334; 74/493, 538, 536; 403/93, 103, 117

[56] References Cited

U.S. PATENT DOCUMENTS

| | | | |
|---|---|---|---|
| B1 457,073 | 2/1986 | Kramer | 180/216 |
| 3,799,569 | 3/1974 | Baker | 280/775 |
| 4,570,739 | 2/1986 | Kramer | 180/216 |
| 5,238,082 | 8/1993 | Stegeman et al. | 180/208 |

*Primary Examiner*—Peter C. English
*Attorney, Agent, or Firm*—Shook, Hardy & Bacon

[57] ABSTRACT

A tiller assembly for steering a personal mobility vehicle. A knuckle joint for the tiller includes a base secured on the front wheel steering spindle and a knuckle element connected for limited pivotal movement on the base. A bolt connects the knuckle element to the base and also connects the tiller to the knuckle joint. A spring loaded pin on the tiller enters spaced apart openings in the knuckle element to lock the tiller to the knuckle element in any one of various positions, including an operating position and a collapsed position. Adjustment screws on the base are contacted by stop surfaces on the knuckle element to limit in both directions the pivoting of the knuckle element. This allows the tiller to float to a limited extent and also to act rigidly when the vehicle user needs to pull himself up by using the tiller. Spacer sleeves on the pivot bolt allow adjustment of the friction between the knuckle element and base without affecting the tiller.

20 Claims, 2 Drawing Sheets

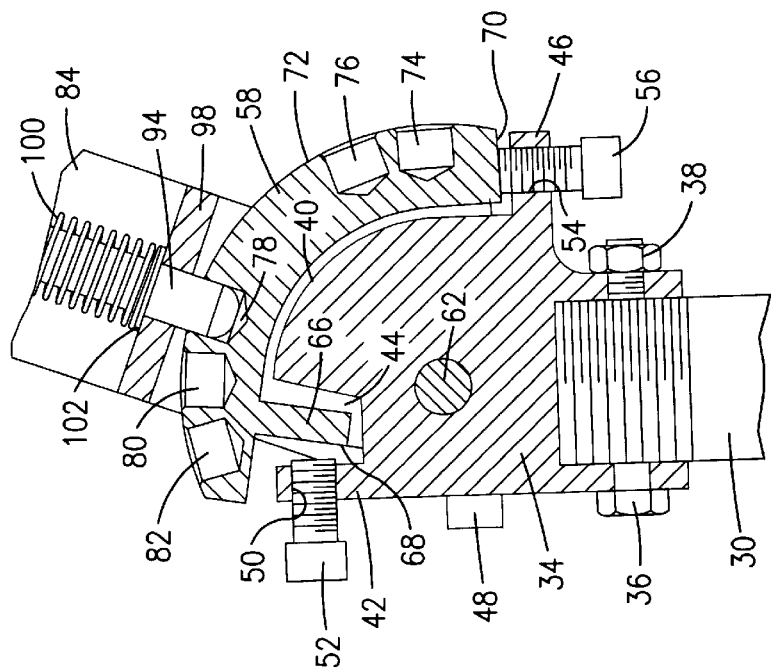
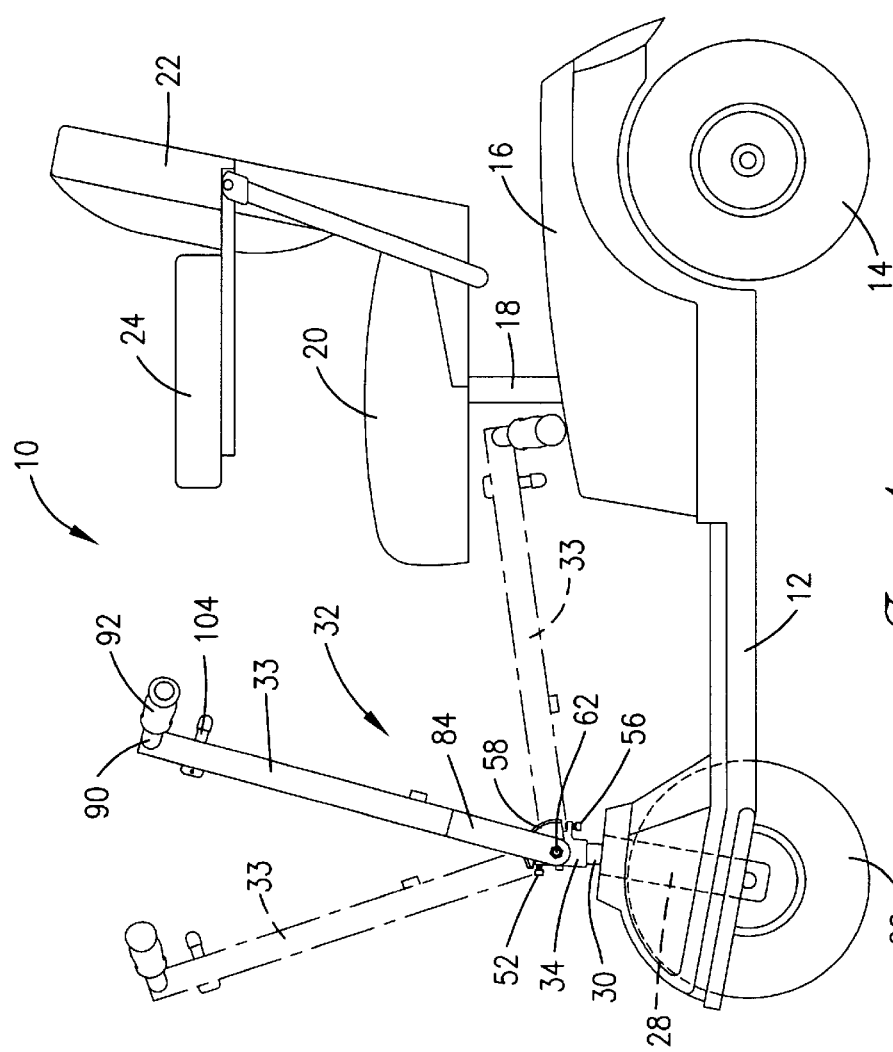
Fig. 3.
Fig. 1.

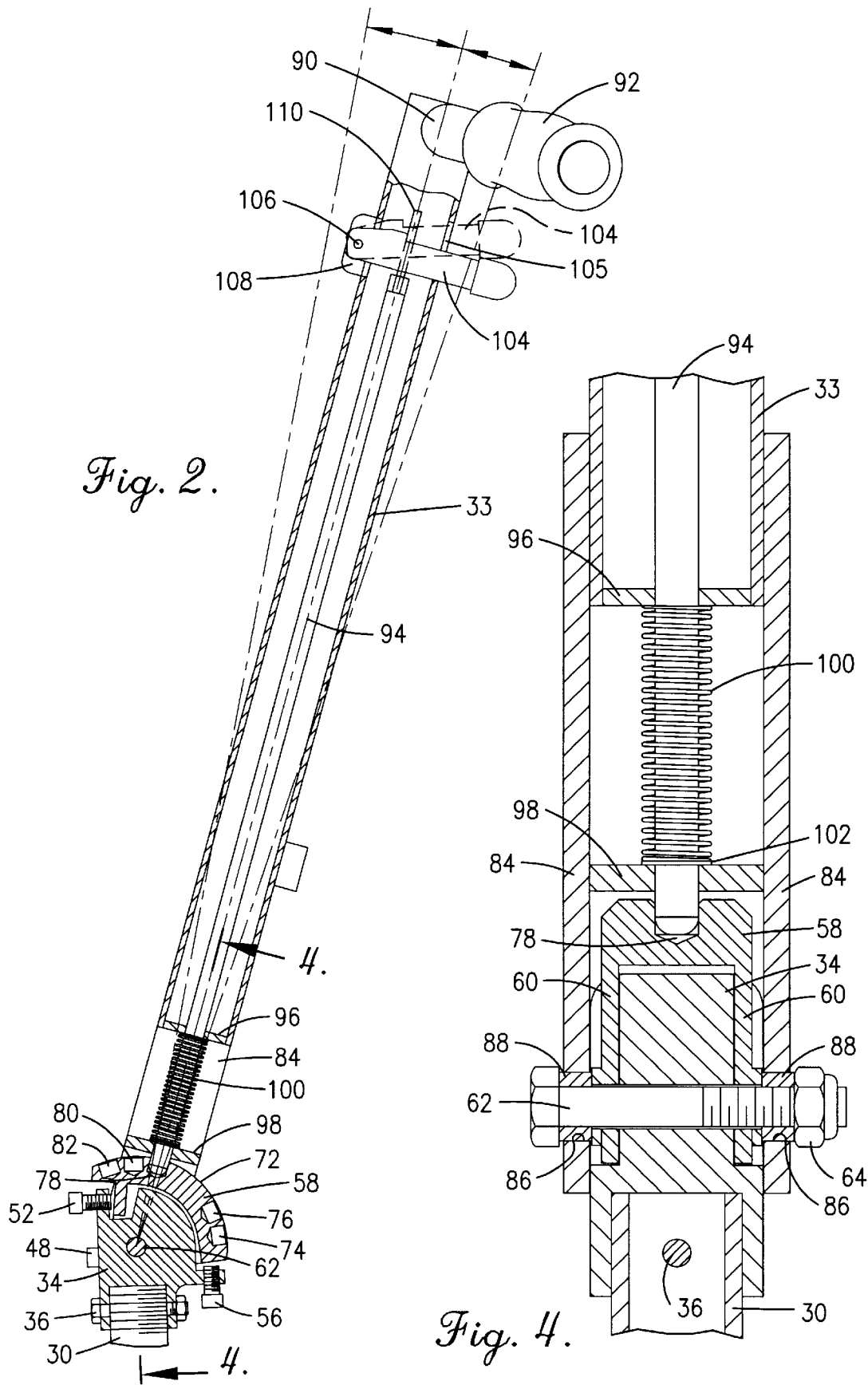

TILLER ASSEMBLY FOR PERSONAL MOBILITY VEHICLES

FIELD OF THE INVENTION

This invention relates to personal mobility vehicles and is directed more specifically to an improved tiller assembly for steering of a personal mobility vehicle or a four wheel personal vehicle.

BACKGROUND OF THE INVENTION

In recent years, small electrically driven vehicles commonly known as personal mobility vehicles have achieved considerable popularity among those who are partially or totally unable to walk. A personal mobility vehicle is a three wheeled vehicle which resembles a small golf cart and is generally more comfortable and convenient than a conventional wheelchair. They are also more maneuverable than wheelchairs, less expensive, and less associated with a stigma.

As disclosed in U.S. Pat. No. 4,570,739 to Kramer, modern personal mobility vehicles are typically constructed in two separate sections which come apart in order to accommodate transport in an automobile trunk or similar space having limited capacity. The back section may include the rear wheel assembly and the drive unit, including the motor. The front section may include the front wheel, the seat, and a tiller which can be collapsed to a compact condition for transport or storage.

In order to allow the tiller to be folded to its collapsed condition, the tiller is normally pivoted to the steering spindle on the front wheel unit. Some tillers are not capable of being locked in place but can instead be adjusted to any desired pivotal position. This type of tiller is commonly referred to as a floating tiller. Although floating tillers allow infinite adjustment so that the handle bars can be situated in the most comfortable operating position for the occupant of the vehicle, their lack of rigidity does not allow their use by the occupant to pull himself or herself upwardly out of the seat. Because many disabled persons need some means for pulling themselves up, this is a serious drawback associated with fully floating tillers.

Another type of tiller is adjustable among several different rigid positions and can be locked in place at any one of the preset positions. One type of lock mechanism that has been used includes a retractable pin on the tiller which can enter spaced apart holes on a block that is carried on the front wheel steering spindle. The principal problem with this type of arrangement is that the pin must be large enough to structurally withstand the loads to which it is subjected without breaking or bending. Consequently, the holes must be equally large, and the arc between adjacent positions of the tiller is relatively large. Fine adjustment of the tiller position is not possible, and not everyone is comfortable using the tiller in one of its defined operating positions.

U.S. Pat. No. 5,238,082 to Stegeman et al. discloses a blade and slot mechanism for locking the tiller in any of its several defined positions. In some respects, this is an improvement over the pin and hole approach because the width of the blade allows it and the slots to be relatively thin and still exhibit the necessary strength. Thus, the slots can be positioned relatively close together to lessen the pivot arc between adjacent tiller positions. This provides a finer adjustment. Nevertheless, there is still a noticeable arcuate increment between the adjacent tiller positions, and some users cannot achieve a tiller operating position that they find comfortable.

SUMMARY OF THE INVENTION

The present invention is directed to a tiller assembly which makes use of the advantages of both the floating and rigid constructions without suffering from the disadvantages of either type of arrangement.

More specifically, it is an object of the invention to provide a partially floating tiller which has rigid positions that allow use of the handlebars to pull up the occupant of the seat and yet accommodates limited floating in each position for adjustment to an operating position that is comfortable to each particular occupant.

Another object of the invention is to provide a tiller of the character described in which the arcuate extent of the floating movement of the tiller can be readily adjusted.

Still another object of the invention is to provide a tiller of the character described in which the force resisting floating movement can be adjusted without affecting the force resisting movement of the tiller between its different positions.

These and other objects are achieved by providing a special knuckle connection between the tiller and the front wheel steering spindle. The knuckle connection includes a base block mounted on the spindle and a knuckle element having an arcuate surface presenting spaced apart openings for receiving a pin carried on the tiller. A bolt pivotally connects the knuckle element with the base and also pivotally connects the tiller with the knuckle assembly. The pin carried on the tiller is urged by a spring toward an extended position where it enters whichever of the openings is aligned with it to lock the tiller and knuckle element together. The knuckle element is pivotal relative to the base, but this movement is limited by a pair of screws which are threaded to the base and have tips that engage stop surfaces on the knuckle element to limit its arcuate travel.

In this manner, the tiller can float together with the knuckle element to an extent that is limited by the positions of the screws. When the tiller is at the end of its permitted travel, it can be used as a rigid support to allow the occupant of the seat to pull himself or herself up. The pin is retractable so that it can be withdrawn from the openings to allow the tiller to be pivoted among its operating position, a collapsed position for storage, and a fully extended position providing enough clearance to enable the user to easily enter or depart from the seat. The threaded connection of the screws to the base permits the screws to be adjusted in order to adjust the amount of float that is permitted.

The bolt which forms the pivot axis for both the knuckle element and the tiller is provided with spacer sleeves that fit through openings in the tiller. Consequently, when a nut is applied to the bolt and progressively tightened, the sleeves push the knuckle element against the base with increasing force, thus increasing the friction between them and the resistance to the floating movement. However, because of the presence of the spacer sleeves, there is no change in the friction on the tiller and it can be pivoted easily regardless of how tightly the nut is applied. A close tolerance between the spacers and tiller hole assures a stable side to side feel of the tiller.

DESCRIPTION OF THE DRAWINGS

In the accompanying drawings which form a part of the specification and are to be read in conjunction therewith and in which like reference numerals are used to indicate like parts in the various views:

FIG. 1 is a side elevational view of a personal mobility vehicle equipped with a tiller assembly constructed according to a preferred embodiment of the present invention, with the tiller shown in solid lines in an operating position and in broken lines in a collapsed storage position and a fully extended position;

FIG. 2 is a fragmentary sectional view on an enlarged scale through the tiller assembly;

FIG. 3 is an enlarged sectional view of the knuckle joint shown in FIG. 2; and

FIG. 4 is a fragmentary sectional view on an enlarged scale taken generally along line 4—4 of FIG. 2 in the direction of the arrows.

DETAILED DESCRIPTION OF THE INVENTION

Referring now to the drawings in more detail and initially to FIG. 1, numeral 10 generally designates a personal mobility vehicle of the type that is commonly used by persons that have difficulty walking. The vehicle 10 has a frame 12 which may take the form of a floor pan. At the rear of the vehicle 10, a pair of driven rear wheels 14 are provided and may be driven by a suitable electric drive unit (not shown) which typically includes a drive motor powered by batteries (also not shown). These components are covered by a shroud 16. A seat post 18 projects upwardly above the shroud 16 and supports a seat 20 having a back 22 and arm rests 24.

At the front end of the vehicle 10, a steerable front wheel 26 is mounted on a fork 28 from which a steering spindle 30 extends. The spindle 30 is suitably journaled so that it can rotate on the frame about a vertical axis in order to effect steering of the front wheel 26.

The vehicle 10 may be constructed as a two-section unit with the rear section including the rear wheels and the drive unit and the front section including the floor pan and the front wheel unit. These two sections may be connected such that they can be detached to provide a compact configuration for transport of the vehicle in an automobile trunk or other relatively limited space.

In accordance with the present invention, a tiller assembly which is generally identified by numeral 32 includes a tiller 33 having a special knuckle joint connection with the front wheel steering spindle 30. As best shown in FIG. 3, a base member 34 of the knuckle joint is threaded onto the top end of the spindle 30 and secured by a bolt 36 which extends through the lower portion of the base 34, through the upper portion of the spindle 30, and is secured by a nut 38. The base 34 may be a generally solid block having an arcuate top surface 40. At the front end of the base 34, a plate 42 projects upwardly immediately in front of a recess 44 extending into the base 34. Projecting rearwardly from block 34 at the lower end of the arcuate surface 40 is another small plate 46. The plates 42 and 46 are approximately perpendicular to one another. A bar 48 is secured to extend across the front face of base 34 at a location approximately midway along the height of the base.

Plate 42 is provided with a threaded opening 50 which receives a screw 52. The other plate 46 is similarly provided with a threaded opening 54 which receives another screw 56. The screws 52 and 56 serve as stop elements in a manner that will be explained in more detail.

The knuckle joint for the tiller assembly also includes a knuckle element 58 which is fitted on the base 34 and extends generally along the arcuate surface 40. As best shown in FIG. 4, the knuckle element 58 has flat opposite sides 60 which extend downwardly and contact the opposite sides of the base 34. The knuckle element 58 is connected with the base 34 by a horizontal bolt 62 which extends through the opposite sides 60 and through the base 34 and may be secured by a lock nut 64. On the outside surfaces of the sides 60, bosses 65 are formed around the bolt holes.

The bolt 62 establishes a horizontal axis about which the knuckle element 58 can pivot on block 34 to a limited extent. Near its forward end, the knuckle element 58 has a downwardly projecting plate 66 which extends into the gap 44 in the base 34. The plate 66 has a flat forward surface 68 which provides a stop surface that contacts the tip of screw 52 in order to limit the pivotal movement of the knuckle element in a counterclockwise direction as viewed in FIG. 3. The lower end of the knuckle element 58 terminates in a flat surface 70 which contacts the tip of the other screw 56 to limit pivotal movement of the knuckle element in a clockwise direction as viewed in FIG. 3.

The screws 52 and 56 can be adjusted by threading them in or out to vary the extent to which their tips project toward the stop surfaces 68 and 70. In this manner, the arc through which the knuckle element 58 is permitted to pivot can be adjusted as desired. The screws 52 and 56 may both be extended into contact with the corresponding stop surfaces 68 and 70 in order to preclude any pivotal movement of the knuckle element 58. Conversely, the screws 52 and 56 may both be backed off completely such that neither projects beyond its plate 42 or 46. In these circumstances, the permitted travel of the knuckle element is at its maximum, being limited in one direction by engagement of surface 68 against plate 42 and in the other direction by engagement of surface 70 against plate 46.

It has been found that a maximum travel of the knuckle element 58 through an arc of approximately 12° is advantageous from a practical standpoint. Accordingly, it is preferred that the knuckle element be permitted to float in a pivotal fashion through approximately 12° total arcuate travel when the two screws 52 and 56 are both backed off completely.

With continued reference to FIG. 3 in particular, the body of the knuckle element 58 has an arcuate shape and presents an upper arcuate surface 72 which extends about the axis of the bolt 62. A number of openings extend into the arcuate surface 72, including a pair of openings 74 and 76 which are spaced apart from one another near the lower end of the knuckle element 58. The openings 74 and 76 correspond to two different collapsed positions of the tiller 33. Another pair of openings 78 and 80 extend into the arcuate surface 72 at locations spaced well away from the openings 74 and 76 near the forward end of the knuckle element. Openings 78 and 80 are spaced apart from one another and correspond to two different operating positions of the tiller 33. A final opening 82 is located beyond openings 78 and 80 near the forward edge of surface 72. Opening 82 corresponds to a fully extended position of tiller 33 to provide clearance for the user of the vehicle to enter or depart from it. All of the openings have center lines that intersect with the center of the bolt 62.

The tiller 33 may take the form of a square tube having a pair of spaced apart straps 84 projecting from its bottom end. The tiller is connected with the knuckle joint for pivotal movement about the axis provided by the bolt 62. As shown in FIG. 4, the lower end portions of the straps 84 are provided with enlarged openings 86 which receive spacer sleeves 88 through which the bolt 62 extends. The bosses 65 fill in the gaps between the sides 60 of the knuckle element and the straps 84 to prevent undue wobbling of the tiller. The head of the bolt 62 engages one of the sleeves 88 and presses the sleeve against the boss 65 on one of the sides 60 of the knuckle element 58. The nut 64 engages the other sleeve 88 and presses it against the boss 65 on the other side 60 of the knuckle element when the nut is tightened on the bolt.

The top end of the tiller 33 is provided with handlebars 90 and suitable hand grips 92. The top end of the tiller 33 is also equipped with a control console (not shown) having various controls such as a forward/reverse control, a speed control, and various types of indicators. The entire tiller 33 is normally enclosed within a decorative shroud (not shown).

An elongated rod or pin 94 extends within the tiller 33. As best shown in FIG. 4, the bottom end portion of the pin 94 extends through an end plate 96 on the bottom end of the tiller tube and also through another plate 98 which extends between the side straps 84. Openings through the plates 96 and 98 closely receive the pin 94 to provide guidance which maintains the pin at a centered position in the tiller.

A compression spring 100 is coiled around the lower end portion of pin 94 and engages the underside of plate 96 at the top end of the spring. The bottom end of the spring 100 acts against a snap ring 102 which is secured on the pin 94 near its lower end. The snap ring 102 normally seats against the plate 98. The spring 100 continuously urges pin 94 toward a fully extended position in which the tip of the pin can enter whichever of the openings in the knuckle element 58 is aligned with the pin. For example, FIG. 3 shows the pin 94 extending into opening 78.

Pin 94 can be retracted from the knuckle element openings by moving it axially to a retracted position. As shown in FIG. 2, a finger lever 104 extends through a slot 105 in the top end portion of tiller 33 and is pivoted at 106 between a pair of lugs 108 extending from the tiller. The lever 104 extends through a bar 110 which is connected with the top end of the pin 94. The action of the compression spring 100 normally maintains lever 104 in the solid line position shown in FIG. 2. However, the lever 104 can be pivoted upwardly to the broken line position of FIG. 2, thus pulling pin 94 upwardly to the retracted position in which the tip of the pin is withdrawn from the knuckle element openings.

In use, the tiller 33 may be situated in one of its two operating positions such as the one shown in FIG. 1 where the handle bars 90 are located directly in front of the seat 20 for comfortable access by the occupant of the seat. The handle bars can be turned to the left or right in order to turn the tiller to the left or right for steering of the vehicle 10. When the tiller is turned, the front wheel steering stem 30 is turned in the same direction and to the same extent due to the knuckle joint and the connection provided by the bolt 62. This turns the fork 28 for steering of the front wheel 26. A stop bracket (not shown) may be provided to limit the turning so that the tiller is not able to be turned through a full revolution.

The two operating positions that are provided correspond to the openings 78 and 80, and the pin 94 may be positioned in whichever of these openings provides the most comfortable operating position for the occupant of the vehicle. It is noted that the positions of the tiller are not rigid ones but that instead, the tiller is allowed to float to a limited extent due to the construction or the knuckle joint. The screws 52 and 56 may be adjusted to allow the amount of float that is desired. With the screws adjusted to the position shown in FIG. 3, the tiller can float in a clockwise position to the limiting position shown, where surface 70 contacts the tip of screw 56. The tiller can pivot or float in the counterclockwise direction through an arc that is limited by contact of the stop surface 68 with the tip of the other screw 52. With the preferred travel arc of 14°, an overlap is provided between the two operating positions defined by the openings 78 and 80. Consequently, there is an infinite adjustment permitted between the limiting position in a clockwise direction with pin 94 in opening 78 and the opposite limiting position which would be one in which the pin 94 is positioned in opening 80 and the stop surface 68 is in engagement with the screw 52 (or plate 42 if the screw is backed completely out). This full range of positions accommodates virtually all users of the vehicle 10.

When the tiller is in the position shown in FIG. 3, it may be used by the occupant of the seat to pull himself or herself up out of the seat. The contact between the stop surface 70 and the tip of screw 56 provides the necessary rigidity that allows the seat occupant to pull himself or herself up by pulling on the handle bars.

As previously indicated, openings 74 and 76 correspond to collapsed storage positions of the tiller. When the pin 94 is positioned in the end opening 74, the tiller 33 is in the position shown in broken lines in FIG. 1 where the end of the tiller is beneath the seat in a compact storage position. The other opening 76 provides another collapsed position which is not quite as extreme as that provided by opening 74. In either case, the tiller is collapsed so that the vehicle 10 can be disassembled into two different sections which can be conveniently transported in an automobile trunk or other space having limited capacity.

When the pin is positioned in the forwardmost opening 82, the tiller is in the extended or forwardmost position shown in broken lines in FIG. 1. In this position, the tiller is forward far enough that there is sufficient clearance to allow the user to enter the vehicle and sit on the seat 20 or depart from the vehicle without interference from the tiller. The tiller can be moved between its different positions by pulling upwardly on the lever 104 to retract pin 94 from the knuckle joint elements and then pivoting the tiller to the desired position before releasing the lever 104 so that pin 94 can enter the opening that is then in alignment with it. When the pin 94 is retracted, excessive pivoting of the tiller 33 is prevented by engagement of the forward edges of the straps 84 with bar 48.

The ease of the floating pivotal movement of the knuckle element 58 relative to the base 34 can be adjusted by tightening or loosening the nut 64. Progressive tightening of the nut 64 on bolt 62 results in the spacers 88 pushing inwardly against the opposite sides 60 of the knuckle element with increasing force. This in turn increases the friction between the sides 60 and the base 34, and the increased friction results in an increase in the force required to "float" the knuckle element 58 on the base 34. Conversely, when the nut 64 is loosened on the bolt 62, the friction between the knuckle element and base is reduced, and the knuckle element can float more easily due to the decrease in the frictional resistance.

The spacers 88 provide the important function of allowing the friction to be varied between the knuckle element and base without affecting the ease with which the tiller 33 can be pivoted. Tightening of the nut 64 has no effect on the tiller, so the tiller can be pivoted easily among its different positions regardless of how tightly the nut 64 is applied to the bolt 62.

It is thus apparent that the tiller assembly of the present invention allows the tiller 33 to be adjusted to a comfortable position for operation by the occupant of the vehicle while at the same time allowing the tiller to be used to pull the occupant upwardly out of the seat 20. The present invention thus takes advantage of the infinite adjustment in the tiller position provided by a fully floating tiller and also the rigidity of a fully rigid tiller for pulling the user up out of the seat 20. In addition, ease of the floating movement between the knuckle element 58 and the base 34 can be adjusted without affecting the ease of the pivotal movement of the tiller 33.

While the invention has been described in connection with use for steering a personal mobility vehicle, it is also useful on a four wheeled vehicle having two front wheels. Both front wheels are turned together for steering of the vehicle, and the tiller assembly is connected to a spindle of the steering linkage to carry out the steering function.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. In a personal mobility vehicle having a frame and a front wheel steered by turning a spindle, a tiller assembly comprising:
   a base member mounted on said spindle;
   a knuckle element coupled with said base member for pivotal movement about a substantially horizontal axis;
   means for limiting the pivotal movement of said knuckle element in both directions;
   a tiller having a top end provided with steering means and a bottom end mounted to pivot on said knuckle element;
   at least two openings in said knuckle element spaced arcuately apart thereon;
   a pin carried on said tiller, said pin having an extended position to enter one of said openings aligned therewith to lock the tiller to said knuckle element and a retracted position withdrawn from said openings to allow said tiller to rotate on said knuckle element; and
   means for effecting movement of said pin between the extended and retracted positions.

2. A tiller assembly as set forth in claim 1, wherein said means for limiting the pivotal movement of said knuckle element is adjustable to permit adjustment of the allowed travel of the knuckle element in both directions.

3. A tiller assembly as set forth in claim 1, wherein said means for limiting the pivotal movement of said knuckle element comprises:
   a pair of adjustable stop elements on said base member; and
   stop surfaces on said knuckle element against which the stop elements bear to limit the pivotal movement of the knuckle element, said stop elements being adjustable through a preselected range to vary the allowed travel of the knuckle element in both directions.

4. A tiller assembly as set forth in claim 1, including means for adjusting the resistance to pivotal movement of said knuckle element on said base member.

5. A tiller assembly as set forth in claim 1, including means for adjusting the resistance to pivotal movement of said knuckle element on said base member without changing the resistance to pivotal movement of said tiller on said knuckle element.

6. A tiller assembly as set forth in claim 1, including:
   a bolt for connecting said base member, knuckle element and tiller together, said bolt establishing said substantially horizontal axis;
   a nut threaded onto said bolt; and
   a pair of sleeves on said bolt extending through said tiller and engaging said knuckle element, said bolt having a head engaging one sleeve and said nut engaging the other sleeve to press said knuckle element against said base member without pressing the tiller against the knuckle element when said nut is tightened on the bolt.

7. A tiller assembly as set forth in claim 1, wherein:
   said tiller is pivotal on the knuckle element between a collapsed position for storage and an operating position wherein said steering means is accessible to an occupant of the vehicle; and
   said openings include one corresponding to the collapsed position and another corresponding to the operating position.

8. A tiller assembly as set forth in claim 7, wherein:
   said tiller has an extended position beyond the operating position to facilitate movement past the tiller onto and off of the vehicle; and
   said openings include a third opening corresponding to the extended position.

9. A tiller assembly for a personal mobility vehicle having a frame, a seat on the frame for accommodating an occupant, a front wheel, and a spindle for steering the front wheel, said tiller assembly comprising:
   a base member mounted on the spindle;
   a knuckle element coupled with said base member for pivotal movement about a substantially horizontal pivot axis, said knuckle element having an arcuate surface extending about said axis;
   means for limiting the pivotal movement of said knuckle element in both directions;
   a tiller mounted to said knuckle element for pivotal movement about said pivot axis between a collapsed position for storage and an operating position wherein the tiller presents a top end spaced in front of said seat at a location accessible to an occupant thereof;
   means on said top end of the tiller for steering the front wheel;
   a plurality of openings in said arcuate surface, including one corresponding to the collapsed position and another corresponding to the operating position;
   an elongated pin on said tiller having a tip and having extended and retracted positions, said tip entering an opening aligned therewith in the extended position of the pin to lock the tiller to the knuckle element and said tip withdrawing from said openings in the retracted position of the pin to allow the tiller to be pivoted on the knuckle element; and
   means for effecting the extended and retracted positions of the pin.

10. A tiller assembly as set forth in claim 9, wherein said openings include a third opening in said arcuate surface corresponding to an extended position of the tiller beyond the operating position wherein access past the tiller is provided for movement of the occupant onto and off of the seat.

11. A tiller assembly as set forth in claim 9, wherein said limiting means limits the pivotal movement of said knuckle element to an arc of approximately 12°.

12. A tiller assembly as set forth in claim 9, wherein said limiting means comprises:
 a pair of adjustable stop elements on said base member; and
 stop surfaces on said knuckle element against which the stop elements bear to limit the pivotal movement of the knuckle element, said stop elements being adjustable through a preselected range to vary the allowed travel of the knuckle element in both directions.

13. A tiller assembly as set forth in claim 9, including means for adjusting the resistance to pivotal movement of said knuckle element on said base member without changing the resistance to pivotal movement of said tiller on said knuckle element.

14. A tiller assembly for a personal mobility vehicle having a frame and a front wheel steered by turning a spindle, said tiller assembly comprising:
 a base member mounted on the spindle;
 a knuckle element mounted on said base member for pivotal movement about a substantially horizontal pivot axis;
 a pair of stop surfaces on said knuckle element;
 a pair of threaded stop elements threaded to said base member and having tips engageable with said stop surfaces to limit the pivotal movement of said knuckle element in both directions, said stop elements being adjustable to adjust the pivot arc through which said knuckle element is allowed to move;
 a tiller having a top end portion and a bottom end portion, said top end portion having steering means thereon and said bottom end portion being coupled with said knuckle element for pivotal movement of the tiller about said pivot axis between an operating position and a collapsed position for storage;
 a plurality of openings in said knuckle element, including one corresponding to the collapsed position and another corresponding to the operating position;
 an elongated pin on said tiller movable between extended and retracted positions and biased toward the extended position, said pin entering an opening aligned therewith in the extended position to lock the tiller to the knuckle element and withdrawing from the openings in the retracted position to allow the tiller to be pivoted between its operating and collapsed positions; and
 means on said top end portion of the tiller for effecting the retracted position of the pin.

15. A tiller assembly as set forth in claim 14, including means for adjusting the resistance to pivotal movement of said knuckle element on said base member.

16. A tiller assembly as set forth in claim 14, including means for adjusting the resistance to pivotal movement of said knuckle element on said base member without changing the resistance to pivotal movement of said tiller on said knuckle element.

17. A tiller assembly as set forth in claim 14, including:
 a bolt for connecting said base member, knuckle element and tiller together, said bolt establishing said substantially horizontal axis;
 a nut threaded onto said bolt; and
 a pair of sleeves on said bolt extending through said tiller and engaging said knuckle element, said bolt having a bead engaging one sleeve and said nut engaging the other sleeve to press said knuckle element against said base member without pressing the tiller against the knuckle element when said nut is tightened on the bolt.

18. A tiller assembly as set forth in claim 14, including an arcuate surface on said knuckle element extending about said pivot axis, said openings extending into said arcuate surface.

19. In a personal vehicle having a frame and plural wheels, including at least one front wheel steered by turning a spindle, a tiller assembly comprising:
 a base member mounted on said spindle;
 a knuckle element coupled with said base member for pivotal movement about a substantially horizontal axis;
 means for limiting the pivotal movement of said knuckle element in both directions;
 a tiller having a top end provided with steering means and a bottom end mounted to pivot on said knuckle element;
 at least two openings in said knuckle element spaced arcuately apart thereon;
 a pin carried on said tiller, said pin having an extended position to enter one of said openings aligned therewith to lock the tiller to said knuckle element and a retracted position withdrawn from said openings to allow said tiller to rotate on said knuckle element; and
 means for effecting movement of said pin between the extended and retracted positions.

20. A tiller assembly as set forth in claim 19, including means for adjusting the resistance to pivotal movement of said knuckle element on said base member.

* * * * *